United States Patent Office 3,180,868
Patented Apr. 27, 1965

3,180,868
3,6-DIAMINO-N-(SUBSTITUTED)PYRIDO[2,3-b]-
PYRAZINE-2-CARBOXAMIDES
Thomas S. Osdene, Berwyn, and Arthur A. Santilli, Ardmore, Pa., assignors to American Home Products Corporation, New York, N.Y., a corporation of Delaware
No Drawing. Filed July 24, 1963, Ser. No. 297,231
5 Claims. (Cl. 260—250)

This invention relates to novel pyrido[2,3-b]pyrazine-2-carboxamide compounds which possess useful pharmacological properties. More particularly, this invention is concerned with 3,6-diaminopyrido[2,3-b]pyrazine-2-carboxamides having a tertiary aminoalkyl, an oxyalkyl or an alkylthioalkyl substituent on the nitrogen atom of the carboxamide group. As used herein the term oxyalkyl refers to hydroxyalkyl and to alkoxyalkyl substituents.

Preferred compounds in accord with this invention are represented by the following general formula:

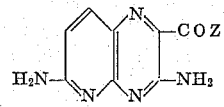

where Z is

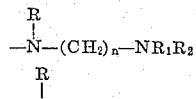

or

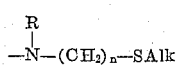

wherein R represents hydrogen or a lower alkyl group having up to 2 carbon atoms; $R_1$ and $R_2$ represent lower alkyl groups having up to 5 carbon atoms, and when taken together to form a closed ring, represent a morpholino, piperidino or pyrrolidino radical; Alk represents a lower alkyl group having up to 4 carbon atoms and the letter "n" is an integer ranging from 2 to 4.

The compounds of this invention are prepared by reacting in an anhydrous alcohol such as ethanol, or 2-ethoxy-ethanol, in the presence of a basic catalyst, preferably sodium metal, 2,6-diamino-3-nitrosopyridine with a 2-cyano-N-(tert-aminoalkyl)acetamide, a 2-cyano-N-alkyl-N-(tert-aminoalkyl)acetamide or with a 2-cyano-N-(oxyalkyl)acetamide, a 2-cyano-N-alkyl-N-(oxyalkyl)acetamide or with a 2-cyano-N-(alkylthioalkyl)acetamide or its N-alkyl derivative in which the alkyl moieties are as defined above for the final products. These starting acetamides are prepared by treating ethyl cyanoacetate with the appropriate amine with or without a solvent.

In preparing the compounds of this invention, the above-named reactants are refluxed and agitated for a period of time of about four hours. The reaction mass is then concentrated to precipitate the desired product which is removed and recrystallized from ethanol or aqueous ethanol.

The invention will be more fully set forth in the following more detailed description which includes examples that are given as illustrative embodiments of the invention and not as limitations thereof.

Example 1

To a solution of 0.2 g. of sodium in absolute ethanol was added 6.9 g. of 2,6-diamino-3-nitrosopyridine and 10 g. of 2-cyano-N-(2-diethylaminoethyl)acetamide. The mixture was stirred and boiled under reflux for 4 hrs., and was then concentrated to a volume of 200 ml. on a rotary evaporator. After cooling, the yellow precipitate which had formed was removed by filtration. Recrystallization from ethanol afforded 3,6-diamino-N-(2-diethylaminoethyl)pyrido[2,3-b]pyrazine-2-carboxamide, M.P. 216–217°, wt.=8.45 g.

Analysis.—Calculated: C=55.43, H=6.98, N=32.32. Found: C=55.28, H=6.74, N=32.33.

When tested pharmacologically by the Agar Serial Dilution Technique, this compound exhibited activity against Bacillus subtilis 6633 and SR, S. aureus, Mycobacterium spp., Escherichia coli SR, Salmonella paratyphi and Brucella bronchiseptica.

Example 2

To a solution of 0.5 g. of sodium in 400 ml. of dried 2-ethoxyethanol was added 9.66 g. of 2,6-diamino-3-nitrosopyridine, followed by 13.0 g. of 2-cyano-N-(3-dimethylaminopropyl)acetamide. The mixture was stirred and boiled under reflux for 4 hrs. and then was filtered. The solvent was removed on a rotary evaporator when a brown residue was obtained, wt.=17.59, M.P. 210°. Recrystallization from aqueous ethanol afforded 3,6-diamino-N - (3-dimethylaminopropyl)pyrido[2,3-b]pyrazine-2-carboxamide, M.P. 209°.

Analysis.—Calculated: C=53.98, H=6.57, N=33.91. Found: C=53.91, H=6.36, N=33.91.

When tested for antibacterial activity by the Agar Serial Dilution Technique, this compound was active against B. subtilis 6633, S. aureus 209P and L. casei. The compound also exhibited diuretic activity.

Example 3

To a solution of 0.2 g. of sodium in 200 ml. of absolute ethanol was added 4.14 g. of 2,6-diamino-3-nitrosopyridine, followed by 5.15 g. of 2-cyano-N-(2-ethoxyethyl)-acetamide. The mixture was stirred and boiled under reflux for 2 hrs. On cooling a yellow precipitate was obtained which was removed by filtration, wt.=7.4 g., M.P. 212°. Recrystallidation from ethanol afforded 3,6-diamino - N - (2-ethoxyethyl)pyrido[2,3-b]pyrazine-2-carboxamide, M.P. 216°.

Analysis.—Calculated: C=52.16, H=5.84, N=30.42. Found: C=51.89, H=5.67, N=30.41.

When tested pharmacologically, this compound exhibited anti-inflammatory activity.

Example 4

To a solution of 0.97 g. of sodium in 200 ml. of absolute ethanol was added 4.96 g. of 2,6-diamino-3-nitrosopyridine, followed by 5.4 g. of 2-cyano-N-(2-hydroxyethyl)acetamide. The mixture was stirred and boiled under reflux for 25 mins. during which time a yellow precipitate was deposited. After cooling, this was removed by filtration, wt.=5.2 g., M.P. 275–278°. Recrystallization from water afforded 3,6-diamino-N-(2 hydroxyethyl)pyrido[2,3-b]pyrazine-2-carboxamide, M.P. 283–284°.

Analysis.—Calculated: C=48.38, H=4.87, N=33.06. Found: C=48.24, H=4.63, N=33.92.

In a manner similar to the method exemplified in the above examples, the following pyrido [2, 3-b] pyrazine 2-carboxamides are made by reacting 2,6-diamino-3-nitrosopyridine with the appropriate cyanoacetamide as indicated in the following table.

| Cyanoacetamide derivative used | Name of product |
|---|---|
| 2-cyano-N-(2-dimethylaminoethyl)acetamide. | 3,6-diamino-N-(2-dimethylaminoethyl)pyrido[2,3-b]pyrazine-2-carboxamide. |
| 2-cyano-N-(4-ethoxybutyl)acetamide. | 3,6-diamino-N-(4-ethoxybutyl)pyrido[2,3-b]pyrazine-2-carboxamide. |
| 2-cyano-N-(2-methoxyethyl)acetamide. | 3,6-diamino-N-(2-methoxyethyl)pyrido[2,3-b]pyrazine-2-carboxamide. |
| 2-cyano-N-(3-isopropoxypropyl)acetamide. | 3,6-diamino-N-(3-isopropyl)pyrido[2,3-b]pyrazine-2-carboxamide. |
| 2-cyano-N-(2-morpholinoethyl)acetamide. | 3,6-diamino-N-(2-morpholinoethyl)pyrido[2,3-b]pyrazine-2-carboxamide. |
| 2-cyano-N-(2-piperidinoethyl)acetamide. | 3,6-diamino-N-(2 piperidinoethyl)pyrido[2,3-b]pyrazine-2-carboxamide. |
| 2-cyano-N-(2-diisopropylaminoethyl)acetamide. | 3,6-diamino-N-(2-diisopropylaminoethyl)pyrido[2,3-b]pyrazine-2-carboxamide. |
| 2-cyano-N-methyl-N-(2-dimethylaminoethyl)acetamide. | 3,6-diamino-N-methyl-N-(2-dimethylaminoethyl)pyrido[2,3-b]pyrazine-2-carboxamide. |
| 2-cyano-N-(3-diethylaminopropyl)acetamide. | 3,6-diamino-N-(3-diethylaminopropyl)pyrido[2,3-b]pyrazine-2-carboxamide. |
| 2-cyano-N-(3-di-n-butylaminopropyl)acetamide. | 3,6-diamino-N-(3-di-n-butylaminopropyl)pyrido[2,3-b]pyrazine-2-carboxamide. |
| 2-cyano-N-(2-dimethylaminopropyl)acetamide. | 3,6-diamino-N-(2-dimethylaminopropyl)pyrido[2,3-b]pyrazine-2-carboxamide. |
| 2-cyano-N-(3-morpholinopropyl)acetamide. | 3,6-diamino-N-(3-morpholinopropyl)pyrido[2,3-b]pyrazine-2-carboxamide. |
| 2-cyano-N-(2-pyrrolidinoethyl)acetamide. | 3,6-diamino-N-(2-pyrrolidinoethyl)pyrido[2,3-b]pyrazine-3-carboxamide. |
| 2-cyano-N-(4-dimethylaminobutyl)acetamide. | 3,6-diamino-N-(4-dimethylaminobutyl)pyrido[2,3-b]pyrazine-2-carboxamide. |
| 2-cyano-N-ethyl-N-(2-dimethylaminoethyl)acetamide. | 3,6-diamino-N-ethyl-N-2-dimethylaminoethyl)pyrido[2,3-b]pyrazine-2-carboxamide. |
| 2-cyano-N-(3-methoxypropyl)acetamide. | 3,6-diamino-N-(3-methoxypropyl)pyrido[2,3-b]pyrazine-2-carboxamide. |
| 2-cyano-N-(2-ethylthioethyl)acetamide. | 3,6-diamino-N-(2-ethylthioethyl)pyrido[2,3-b]pyrazine-2-carboxamide. |
| 2-cyano-N-(4-butylthiobutyl)acetamide. | 3,6-diamino-N-(4-butylthiobutyl)pyrido[2,3-b]pyrazine-3-carboxamide. |
| 2-cyano-N-(4-butoxybutyl)acetamide. | 3,6-diamino-N-(4-butoxybutyl)pyrido[2,3-b]pyrazine-2-carboxamide. |
| 2-cyano-N-ethyl-N-(3-isopropoxypropyl)acetamide. | 3,6-diamino-N-ethyl-N-(3-isopropoxypropyl)pyrido[2,3-b]pyrazine-2-carboxamide. |
| 2-cyano-N-ethyl-(4-butylthiobutyl)acetamide. | 3,6-diamino-N-ethyl (4-butylthiobutyl)pyrido[2,3-b]pyrazine-2-carboxamide. |

The compounds of this invention exhibit antibacterial, antiviral, diuretic and anti-inflammatory effects. All the compounds of the invention therefore are of value in the study of biological processes in laboratory animals.

The compounds of this invention can be administered in a wide variety of oral or parenteral unit dosage forms, singly, or in admixture with other active compounds.

The present invention also includes the process of bringing the compounds thereof into a form suitable for therapeutic administration by associating them with liquid or solid, pharmaceutically acceptable carriers.

Various changes and modifications of this invention can be made by those skilled in the art to which it relates and to the extent that such variations incorporate the spirit of the invention, they are included in the scope of the claims.

What is claimed is:
1. A compound of the formula:

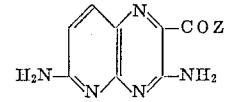

where Z is selected from the group of

and

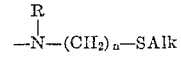

wherein R is selected from the group of hydrogen and lower alkyl having up to 2 carbon atoms; $R_1$ and $R_2$ represent lower alkyl groups having up to 5 carbon atoms, and when taken together to form a closed ring, represent a member of the group consisting of morpholino, piperidino and pyrrolidino; Alk represents a lower alkyl group having up to 4 carbon atoms and the letter "$n$" is an integer ranging from 2 to 4.

2. 3,6-diamino-N-(3-dimethylaminopropyl)pyrido[2,3-b]pyrazine-2-carboxamide.

3. 3,6-diamino-N-(2-diethylaminoethyl)pyrido[2,3-b]pyrazine-2-carboxamide.

4. 3,6-diamino-N-(2-ethoxyethyl)pyrido[2,3-b]pyrazine-2-carboxamide.

5. 3,6-diamino-N-(2-hydroxyethyl)pyrido[2,3-b]pyrazine-2-carboxamide.

References Cited by the Examiner

Osdene et al.: J. Chem. Soc., London (1955), pages 2027-31.

IRVING MARCUS, *Primary Examiner.*

NICHOLAS S. RIZZO, *Examiner.*